United States Patent
Fujieda et al.

(10) Patent No.: US 7,182,086 B2
(45) Date of Patent: Feb. 27, 2007

(54) MOUTH GUARD AND SHEET FOR MOUTH GUARD

(75) Inventors: Yukihiro Fujieda, Okayama (JP); Kazuaki Takada, Tokyo (JP); Koichi Wada, Ibaraki (JP); Miyuki Kaneyama, Nara (JP); Koji Inai, Okayama (JP)

(73) Assignee: Kuraray Co., Ltd., Kurashiki (JP)

( * ) Notice: Subject to any disclaimer, the term of this patent is extended or adjusted under 35 U.S.C. 154(b) by 361 days.

(21) Appl. No.: 10/479,162

(22) PCT Filed: May 29, 2002

(86) PCT No.: PCT/JP02/05178

§ 371 (c)(1),
(2), (4) Date: Dec. 1, 2003

(87) PCT Pub. No.: WO02/098521

PCT Pub. Date: Dec. 12, 2002

(65) Prior Publication Data

US 2004/0149292 A1 Aug. 5, 2004

(30) Foreign Application Priority Data

Jun. 1, 2001 (JP) ............................. 2001-166448

(51) Int. Cl.
*A61C 5/14* (2006.01)
*C08F 12/08* (2006.01)
(52) U.S. Cl. .................................. 128/862; 525/333.3
(58) Field of Classification Search ............... 128/862; 525/331.9, 333.1, 333.2, 333.3
See application file for complete search history.

(56) References Cited

U.S. PATENT DOCUMENTS

| | | | | |
|---|---|---|---|---|
| 3,251,905 A | * | 5/1966 | Zelinski | ...... 525/272 |
| 3,411,501 A | * | 11/1968 | Greenberg | ...... 128/862 |
| 6,397,848 B1 | * | 6/2002 | Kagekata et al. | ...... 128/862 |
| 6,415,794 B1 | * | 7/2002 | Kittelsen et al. | ...... 128/859 |
| 6,588,430 B2 | * | 7/2003 | Kittelsen et al. | ...... 128/859 |
| 6,987,140 B2 | * | 1/2006 | Kamohara et al. | ...... 524/277 |

FOREIGN PATENT DOCUMENTS

| | | |
|---|---|---|
| JP | 2594830 | 12/1996 |
| JP | 2001-54610 | 2/2001 |

* cited by examiner

*Primary Examiner*—Sharon E. Kennedy
(74) *Attorney, Agent, or Firm*—Oblon, Spivak, McClelland, Maier & Neustadt, P.C.

(57) ABSTRACT

A mouth guard which is excellent in impact absorbability and durability, is thin and has good fittability, and is able to easily chew thereupon, and does not give vomiting feel; and a sheet for mouth guard which is suitable for producing the mouth guard. The mouth guard or the sheet for mouth guard comprises at least one block copolymer selected from the group consisting of a block copolymer (a-1) comprising polymer blocks A made of a vinyl aromatic compound, and polyisoprene blocks B having a content of 1,2-bonds and 3,4-bonds of 40% by mol or more; a block copolymer (a-2) comprising polymer blocks A, and polymer blocks C which contain an isoprene unit and a butadiene unit in a ratio of from 5/95 to 95/5 (% by weight) and have a content of 1,2-bonds and 3,4-bonds of 40% by mol or more; and a block copolymer (a-3) comprising polymer blocks A, and polybutadiene blocks D having a content of 1,2-bonds of 60% by mol or more, wherein a content of vinyl aromatic compound units in each of the copolymers is from 10 to 40% by weight, and a hydrogenated product thereof (b-1) to (b-3).

19 Claims, No Drawings

MOUTH GUARD AND SHEET FOR MOUTH GUARD

TECHNICAL FIELD

The present invention relates to a mouth guard which is excellent in impact absorbability and durability (tear resistance), and is excellent in fittability because of being made thinner than conventional products, and able to easily chew thereupon without giving any vomiting feel, and a sheet for the mouth guard.

BACKGROUND ART

A mouth guard is employed for the purpose of preventing a brain concussion and protecting teeth, oral cavity, lips, jaw bones or the like, and it is rather mandatory particularly in contact athletic sports such as American football and boxing. While various materials are used to produce mouth guards, one used largely in these days is an ethylene-vinyl acetate copolymer (hereinafter sometimes abbreviated as EVA). Besides the copolymers, there are mouth guards made of a polyolefinic rubber, silicone rubber, an ethylene-vinyl acetate copolymer supplemented with a thermoplastic polycaprolactone as disclosed in Japanese Patent Gazette No. 2594830. However, since a conventional mouth guard produced from an EVA alone has a low impact absorbability, there has been necessitated to increase its thickness (about 4 mm) in order to increase the impact absorption. Therefore, there are some problems of being not easily conversable, not easily breathing and the like. In addition, the mouth guard has a poor durability, which experiences a tear due to cracks developed during use. Furthermore, the shape of the mouth guard is deformed over a long period, so that the fittability tends to be worsened.

For the reasons described above, there has been proposed in Japanese Patent Laid-Open No. 2001-54610 a mouth guard composition comprising a styrene block copolymer component having excellent durability, an aliphatic saturated hydrocarbon-based resin and/or an ester gum component for giving an impact absorbability and a softening property at a low temperature, and an organopolysiloxane component for reducing stickiness during handling. However, since three or more materials are used as composite relative to a conventional method using an EVA material alone, there are some problems in that processability during the production is worsened, and the equipments become too complicated. In addition, recently, it has been known that a mouse guard clearly has an effect of improving athletic sport performance in addition to the purpose of protecting a brain concussion and protecting teeth, oral cavity, lips, jaw bones or the like. The reasons therefor are considered to be an improved occlusion of the palates and an ability of being able to chew strongly so that a greater power can be exerted. For these purposes, it is important that the mouth guard has an excellent fittability (fitting feel) and is easily chewed upon without causing any vomiting feel due to a feel of a foreign feel (peculiar odor or taste). However, in the above technique, since an organopolysiloxane is contained in an amount of 0.1 to 10% by weight in the composition, there are some problems that the mouth guard has insufficient fittability so that the mouth guard is disengaged easily, or that the mouth guard gives a vomiting feel.

DISCLOSURE OF INVENTION

An object of the present invention is to provide a mouth guard which is excellent in impact absorbability, durability (tear resistance) and fittability, and able to easily chew thereupon, and does not give vomiting feel; and a sheet for mouth guard which is suitable for producing the mouth guard.

As a result of intensive studies in order to solve the above problems, the present inventors have found that a mouth guard being not only excellent in impact absorbability and durability (tear resistance) but also being excellent in fittability and able to easily chew thereupon without giving any vomiting feel can be obtained by using a styrenic block copolymer having a particular micro-structure as a main component. The present invention has been accomplished thereby.

Specifically, the present invention relates to a mouth guard comprising at least one block copolymer selected from the group consisting of:

a block copolymer (a-1) comprising one or more polymer blocks A made of a vinyl aromatic compound, and one or more polyisoprene blocks B having a content of 1,2-bonds and 3,4-bonds of 40% by mol or more, wherein a content of vinyl aromatic compound units is from 10 to 40% by weight, and a hydrogenated product thereof (b-1);

a block copolymer (a-2) comprising one or more polymer blocks A made of a vinyl aromatic compound, and one or more polymer blocks C which contain an isoprene unit and a butadiene unit in a ratio of from 5/95 to 95/5 (% by weight) and have a content of 1,2-bonds and 3,4-bonds of 40% by mol or more, wherein a content of vinyl aromatic compound units is from 10 to 40% by weight, and a hydrogenated product thereof (b-2); and a block copolymer (a-3) comprising one or more polymer blocks A made of a vinyl aromatic compound, and one or more polybutadiene blocks D having a content of 1,2-bonds of 60% by mol or more, wherein a content of vinyl aromatic compound units is from 10 to 40% by weight, and a hydrogenated product thereof (b-3).

Further, the present invention relates to a sheet for mouth guard comprising at least one block copolymer selected from the group consisting of:

a block copolymer (a-1) comprising one or more polymer blocks A made of a vinyl aromatic compound, and one or more polyisoprene blocks B having a content of 1,2-bonds and 3,4-bonds of 40% by mol or more, wherein a content of vinyl aromatic compound units is from 10 to 40% by weight, and a hydrogenated product thereof (b-1);

a block copolymer (a-2) comprising one or more polymer blocks A made of a vinyl aromatic compound, and one or more polymer blocks C which contain an isoprene unit and a butadiene unit in a ratio of 5/95 to 95/5 (% by weight) and have a content of 1,2-bonds and 3,4-bonds of 40% by mol or more, wherein a content of vinyl aromatic compound units is from 10 to 40% by weight, and a hydrogenated product thereof (b-2); and a block copolymer (a-3) comprising one or more polymer blocks A made of a vinyl aromatic compound, and one or more polybutadiene blocks D having a content of 1,2-bonds of 60% by mol or more, wherein a content of vinyl aromatic compound units is from 10 to 40% by weight, and a hydrogenated product thereof (b-3).

BEST MODE FOR CARRYING OUT THE INVENTION

The polymer block A in the block copolymers (a-1), (a-2) and (a-3) employed in the present invention comprises a vinyl aromatic compound. The vinyl aromatic compound includes, for instance, styrene, α-methylstyrene, 1-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene and the like. Among them, styrene is preferred.

The number-average molecular weight of the polymer block A is not particularly limited. It is preferably within a range of from 2500 to 50000, more preferably within a range of from 2500 to 20000. The number-average molecular weight can be determined by a method described in Examples set forth below.

It is necessary that the content of the vinyl aromatic compound units constituting the polymer block A in the block copolymer is within a range of from 10 to 40% by weight, preferably from 15 to 40% by weight, for any of polymers (a-1), (a-2) and (a-3). When the content of the vinyl aromatic compound units in the block copolymer is less than 10% by weight, mechanical strength of the block copolymer becomes insufficient. On the other hand, when the content of the vinyl aromatic compound units in the block copolymer exceeds 40% by weight, impact absorbability is impaired.

In the present invention, the content of 1,2-bonds and 3,4-bonds (content of vinyl bonds) in the polyisoprene block B, the polymer block C and the polybutadiene block D constituting the block copolymer (provided that the polybutadiene block D contains only the 1,2-bonds; hereinafter referred to the same) is very important in order to exhibit the impact absorbability required for the mouth guard. In other words, a conventional mouth guard made of an EVA-based resin is less likely to absorb the impact satisfactorily as evident from the determination by a Luebke rebound resilience test or the like, and impact absorbability is insufficient in the same manner as in the EVA-based resin when the content of 1,2-bonds and 3,4-bonds of the polyisoprene block B, the polymer block C and the polybutadiene block D constituting the block copolymer is low because a rubber-like resilient characteristic is strong. Since the 1,2-bonds and 3,4-bonds are present at a given level or more in the polyisoprene block B, the polymer block C and the polybutadiene block D constituting the block copolymer of the present invention as described below, the block copolymer has a satisfactory impact absorbability.

In addition, the mouse guard using a rubber-like highly resilient resin gives a poor fitting when being chewed thereupon. However, since the block copolymer as defined in the present invention comprises the polyisoprene block B, the polymer block C and the polybutadiene block D, each having 1,2-bonds and 3,4-bonds at a given level or more, the mouth guard made of the above block copolymer exhibits a satisfactory fit in the mouth and is easily chewed thereupon.

Therefore, it is necessary that the content of 1,2-bonds and 3,4-bonds in the polyisoprene block B constituting the block copolymer (a-1) is 40% by mol or more, preferably from 45 to 90% by mol, more preferably from 50 to 80% by mol. When the content of 1,2-bonds and 3,4-bonds is less than 40% by mol, impact absorbability becomes insufficient and resilient feel becomes too strong when chewed thereupon, so that the fittability (fitting feel) of the mouth guard is impaired.

The number-average molecular weight of the polyisoprene block B is not particularly limited. The number-average molecular weight is preferably within a range of from 10000 to 300000, more preferably within a range of from 100000 to 200000.

It is necessary that the content of 1,2-bonds and 3,4-bonds in the polymer block C in the block copolymer (a-2) is 40% by mol or more, preferably 45% by mol or more, more preferably 50% by mol or more. When the content of 1,2-bonds and 3,4-bonds is less than 40% by mol, impact absorbability is insufficient, and resilient feel becomes too strong when chewed thereupon, so that the fittability (fitting feel) of the mouth guard is impaired. As to the polymer block C, it is necessary that isoprene units and butadiene units are contained in a ratio of from 5/95 to 95/5 (% by weight), preferably from 10/90 to 90/10 (% by weight). In the isoprene units and the butadiene units constituting the polymer block C, if the content of the isoprene units exceeds 95% by weight, its glass transition point (Tg) becomes too high, so that the flexibility is impaired, in a case where the content of 1,2-bonds and 3,4-bonds becomes higher than 85% by mol.

The polymerization forms of isoprene units and butadiene units constituting the polymer block C are not particularly limited. The polymerization forms may be any of random, block, tapered and other forms.

The number-average molecular weight of the polymer block C is not particularly limited. The number-average molecular weight is preferably within a range of from 10000 to 300000, more preferably within a range of from 10000 to 200000.

It is necessary that the content of 1,2-bonds of the polybutadiene block D in the block copolymer (a-3) is 60% by mol or more, preferably 80% by mol or more, more preferably 85% by mol or more. When the content of 1,2-bonds is less than 60% by mol, mechanical properties, impact strength and durability of the mouth guard are impaired, and resilient feel becomes too strong when chewed thereupon, so that the fittability of the mouth guard (fitting feel) is impaired.

The number-average molecular weight of the polymer block D is not particularly limited. The number-average molecular weight is preferably within a range of from 10000 to 300000, more preferably within a range of from 10000 to 200000.

The content of vinyl bonds of the present specification can be determined by the method described in Examples set forth below.

The binding form of each polymer block in the block copolymer is not particularly limited. The binding form may be linear or branched binding, or any combination thereof. Concrete examples of the molecular structure of the block copolymer include A(BA)n, (AB)n, A(CA)n, (AC)n, A(DA)n, (AD)n, and the like, wherein A is a polymer block A made of a vinyl aromatic compound, B is a polyisoprene block B, C is a polymer block C made of isoprene units and butadiene units, D is a polybutadiene block D, and n is an integer of 1 or more. In addition, as the block copolymer, there can be used those having a stellate (for example, [(AB)mX], wherein m is an integer of 2 or more, X is a residue of a coupling agent) molecular structure, obtained by using divinyl benzene, a tin compound, a silane compound or the like as a coupling agent.

The individual block copolymers may comprise only a single kind of molecular structure. Alternatively, the individual block copolymer may be a combination of two or more different kinds of molecular structures, such as a mixture of a triblock type and a diblock type.

The number-average molecular weight of the above block copolymer is preferably within a range of from 12000 to 400000, more preferably within a range of from 30000 to 300000.

In the present invention, there can be also used hydrogenated (hereinafter simply referred to as "hydrogenated")

products of the block copolymers (a-1), (a-2) and (a-3) [block copolymers (b-1), (b-2) and (b-3)].

As processes for preparing the block copolymers (a-1), (a-2) and (a-3), any known processes can be utilized. The processes include, for instance, the following processes (i) to (iii):

(i) a process comprising polymerizing a vinyl aromatic compound using an alkyllithium compound as a polymerization initiator, and thereafter sequentially polymerizing a conjugated diene compound (isoprene and/or butadiene) and a vinyl aromatic compound thereto;

(ii) a process comprising polymerizing a vinyl aromatic compound and thereafter a conjugated diene compound (isoprene and/or butadiene), and coupling the resulting block copolymer using a coupling agent; and (iii) a process comprising polymerizing a conjugated diene compound (isoprene and/or butadiene) using a dilithium compound as a polymerization initiator, and thereafter sequentially polymerizing a vinyl aromatic compound thereto.

In the process described above, as the alkyllithium compound, there may be used, for instance, a compound of which alkyl group has 1 to 10 carbon atoms. Among them, methyllithium, ethyllithium, pentyllithium, n-butyllithium, s-butyllithium and t-butyllithium are preferred. In addition, the coupling agent includes, for instance, halogenated compounds such as dichloromethane, dibromomethane, dichloroethane, dibromoethane, dibromobenzene and tin tetrachloride; ester compounds such as phenyl benzoate and ethyl acetate; divinylbenzene; various silane compounds; and the like. Further, the dilithium compound includes, for instance, naphthalenedilithium, dilithiohexylbenzene and the like.

The amount of the polymerization initiator or coupling agent mentioned above used may be appropriately determined depending upon the desired molecular weight of the block copolymer. Usually, the polymerization initiator is used within a range of from 0.01 to 0.2 parts by weight, and the coupling agent is used within a range of from 0.04 to 0.8 parts by weight, based on 100 parts by weight of the entire monomers used in the polymerization.

In addition, the content of 1,2-bonds and 3,4-bonds in the polyisoprene block B, the polymer block C and the polybutadiene block D (hereinafter simply referred to as conjugated diene block in some cases) can be controlled by using a Lewis base as a cocatalyst upon polymerization. The above Lewis base includes, for instance, ethers such as dimethyl ether, diethyl ether and tetrahydrofuran; glycol ethers such as ethylene glycol dimethyl ether and diethylene glycol dimethyl ether; amine-based compounds such as triethylamine, N,N,N',N'-tetramethyl ethylenediamine (hereinafter simply referred to as TMEDA) and N-methylmorpholin; and the like. The amount of the Lewis base used is, for instance, within a range of from 0.1 to 1000 mols per mol of the lithium atom in the polymerization initiator.

In the polymerization, an organic solvent which is inert to the polymerization initiator is used as a solvent. As the solvent, it is preferable to use an aliphatic hydrocarbon having 6 to 12 carbon atoms such as hexane and heptane, an alicyclic hydrocarbon such as cyclohexane and methylcyclohexane, and an aromatic hydrocarbon such as benzene.

The polymerization is carried out usually within a temperature range of from 0° to 80° C. in any of the above polymerization processes (i) to (iii). The reaction time is usually from 0.5 to 50 hours.

The block copolymers (a-1), (a-2) and (a-3) obtained by the processes described above may be hydrogenated as desired. For example, each of hydrogenated block copolymers (b-1), (b-2) and (b-3) can be produced by employing a known process, for instance, a process in which a molecular hydrogen is reacted with the block copolymers using a known hydrogenation catalyst in a solution state of the block copolymers dissolved in a solvent inert to the reaction. As the hydrogenation catalyst used herein, there may, for instance, be used a heterogeneous catalyst made of a Raney nickel, a metal such as Pt, Pd, Ru, Rh or Ni supported to a carrier made of carbon, alumina, diatomaceous earth, or the like; a Ziegler catalyst comprising a combination of an organometallic compound comprising a metal of Group VIII such as nickel or cobalt with an organoaluminum compound such as triethylaluminium or triisobutyl aluminum, an organolithium compound or the like; a metallocene catalyst comprising a combination of a bis(cyclopentadienyl) compound of a transition metal such as titanium, zirconium or hafnium with an organometallic compound such as lithium, sodium, potassium, aluminum, zinc or magnesium; and the like. The hydrogenation is carried out usually under a hydrogen pressure within a range of from an atmospheric pressure to 200 MPa and a reaction temperature within a range of from room temperature to 250° C. The reaction time is usually from 0.1 to 100 hours. The degree of the hydrogenation is preferably from about 20 to about 100% as a hydrogenation ratio.

The block copolymer thus obtained can be collected by (i) solidifying a reaction liquid mixture, for instance, with methanol, followed by heating or drying under a reduced pressure, or (ii) pouring a reaction solution into a boiling water to remove the solvent azeotropically in a so-called steam-stripping, followed by heating or drying under a reduced pressure.

The mouth guard can be prepared by using a raw material resin comprising one block copolymer selected from the group consisting of the block copolymers (a-1), (a-2) and (a-3) obtained as above and the hydrogenated products thereof (b-1), (b-2) and (b-3), or comprising a combination of those in a given ratio, or using a sheet for mouth guard prepared by subjecting the above resin to a given molding process such as extrusion molding, calendar molding, press molding or injection molding. As the thickness of the sheet, the thinner the more preferable, from the viewpoint of prevention from any hindrances during a competition game, conversation or breathing when the mouth guard is contained in the oral cavity. However, since a certain level of the thickness is necessary from the viewpoint of the properties needed for the protection of the oral cavity, the thickness of the sheet is preferably from 0.5 to 5 mm, more preferably from 1 to 4 mm. Among the resins mentioned above, it is especially preferable to use the block copolymer (a-1) and/or (b-1), because the mouth guard obtained is easily chewed thereupon and has excellent impact absorbability.

The raw material resin described above can contain various additives, such as antioxidants, ultraviolet absorbents, light stabilizers, colorants, crystal-nucleating agent, antibacterial agents and antifungal agents, as desired, within the range so that the effects of the present invention are not impaired. The amount of these additives used is usually within a range of from 0.01 to 5 parts by weight based on 100 parts by weight of the resin. In addition, there can be formulated a rein having little agglutination property, including a polyolefin resin such as a polyethylene, a polypropylene, an ethylene-propylene copolymer, an ethylene-α-olefin copolymer, a hydrogenated polyisoprene, a hydrogenated polybutadiene, a butyl rubber, a polyisobutylene, a polybutene, an ethylene-vinyl acetate copolymer, an ethylene-methacrylic acid copolymer, an ethylene-acrylic acid copolymer, or an ethylene-ethyl acrylate copolymer as desired, within the range so that the effects of the present invention are not impaired.

The present invention also encompasses the sheet for mouth guard mentioned above.

For instance, the mouth guard of the present invention can be prepared by roughly two different methods. In both methods, an impression of the jaw of user is previously obtained. For instance, an impression of the jaw of the user is obtained with an alginate impression material on an commercially available tray. Thereafter, a plaster is poured onto the tray in which the impression is obtained, and the plaster is hardened, thereby preparing a plaster jaw model. One of the methods for preparing a mouth guard is a method comprising previously preparing a sheet for mouth guard, heating this sheet with, for example, a heater until the sheet is softened, contouring the sheet with the jaw model of the user by vacuum molding or the like, thereby preparing a mouth guard matching the oral cavity of the user. Besides the vacuum molding, there can be employed pressure molding, vacuum pressure molding, heat press molding or the like. The other method comprises preparing a concave mold capable of pouring the resin thereinto on the basis of the jaw model, pouring the raw material resin described above thereinto, thereby preparing a mouth guard.

The mouth guard or the sheet for mouth guard of the present invention can be used in the form of a laminate, which is produced by laminating on a surface of the mouth guard or the sheet for mouth guard, layers made of a resin having little agglutination property, such as a polyolefin resin including a polyethylene, a polypropylene, an ethylene-propylene copolymer, an ethylene-α-olefin copolymer, a hydrogenated polyisoprene, a hydrogenated polybutadiene, a butyl rubber, a polyisobutylene, a polybutene, an ethylene-vinyl acetate copolymer, an ethylene-methacrylic acid copolymer, an ethylene-acrylic acid copolymer, or an ethylene-ethyl acrylate copolymer as desired, within the range so that the effects of the present invention are not impaired.

As the mouth guard or the sheet for mouth guard of the present invention, those containing 85% by weight or more of a block copolymer selected from the group consisting of the block copolymers (a-1), (a-2) and (a-3) of the present invention and hydrogenated products thereof (b-1), (b-2) and (b-3) are preferable, especially 90% by weight or more.

The mouth guard obtained as described above has excellent impact absorbability, durability (tear resistance) and fittability, is easily chewed thereupon, and gives no vomiting feel. Furthermore, since the mouth guard of the present invention has excellent impact absorbability, the mouth guard can be made thinner than that of a conventional product, thereby greatly contributing to the improvement in the fittability.

EXAMPLES

The present invention will be described by referring to the following Examples without intending to limit the present invention thereto. As the test methods in Examples, the following methods are employed.

(Content of Styrene)
The content was calculated from the weight of each monomer component used in the polymerization.

(Number-Average Molecular Weight)
The number-average molecular weight (Mn) calculated as polystyrene was obtained by a GPC determination.

(Content of Vinyl Bonds)
A block copolymer not subjected to hydrogenation was dissolved in a deuterated chloroform ($CDCl_3$), and $^1$H-NMR spectrum was determined, and the content of vinyl bonds (content of 1,2-bonds and 3,4-bonds) was calculated from the peak area ascribed to isoprene and/or butadiene and the peak area corresponding to 1,2-bonds and 3,4-bonds.

(Hydrogenation Ratio)
Iodine values of a block copolymer before and after the hydrogenation were determined, and the hydrogenation ratio was calculated from the values obtained.

(Tensile Test)
The tensile strength at break, the tensile elongation at break and the tensile modulus were determined using a dumbbell-shaped No. 3 test piece as prescribed in JIS K6251 with a mechanical strength determining device at a test speed of 200 mm/min, a distance between chucks of 70 mm, a distance between reference marks of 25 mm and a test piece temperature of 23° C.

(Tensile Impact Strength)
The tensile impact strength was determined using a dumbbell-type L test piece as prescribed in ASTM D1822 at a weight of a hammer of 3.970 kg, a distance between a shaft of the hammer and a center of gravity of 22.06 cm, a lift angle of the hammer of 135°, and a test piece temperature of 37° C.

(Tear Test)
The tear strength and the elongation at break (tear elongation) were determined using a notched angled test piece as prescribed in JIS K6252 at a test speed of 500 mm/min and a test piece temperature of 37° C.

(Durometer Hardness Test)
As prescribed in JIS K6253, the hardness was determined by stacking three 2-mm thick sheets. The determination was made with a type A durometer at a test piece temperature of 25.5° C.

(Chewability)
From questionnaire results after asking fifty senior high school rugby football players as monitors to wear mouth guards during practice and games for 3 months, the fittability was numerically expressed (0 to 100 points) by multiplying the following evaluation score by the number of the players.
2: very chewable,
1: moderate, and
0: very repelling and not easily chewable.

(Vomiting Feel)
From questionnaire results after asking fifty senior high school rugby football players as monitors to wear mouth guards during practice and games for 3 months, the vomiting feel was numerically expressed (0 to 100 points) by multiplying the following evaluation score by the number of the players.
2: completely no vomiting feel,
1: slight vomiting feel, and
0: severe vomiting feel.

Example 1

Styrene was polymerized at 60° C. in a dried, nitrogen-replaced pressure vessel using cyclohexane as a solvent and s-butyllithium as a polymerization initiator, and thereafter TMEDA was added thereto as a Lewis base. Next, isoprene and styrene were sequentially polymerized, thereby obtaining a styrene-isoprene-styrene block copolymer. The resulting block copolymer had a content of styrene of 20% by weight, a number-average molecular weight of 103000 and a content of vinyl bonds (content of 1,2-bonds and 3,4-bonds) of 75% by mol. Table 1 summarizes the properties of the block copolymers obtained in Example 1, and Examples 2 to 5 and Comparative Examples 3 and 4 described below.

The resulting block copolymer was subjected to pressure molding at 150° C. to give a sheet for mouth guard having a thickness of 2 mm. The tensile test, the tensile impact test, the tear test and the durometer hardness test were carried out using this sheet. The results are shown in Table 2.

This sheet was also subjected to a Luebke rebound resilience test as prescribed in JIS 6255. As a result, there was confirmed that the impact was absorbed very rapidly upon impact as shown by 7% (first time), 0.6% (second time) and 0.2% (third time).

The determinations of each of the properties were made using a sheet for mouth guard. However, the properties of the sheet show the properties of mouth guard put on directly because the mouth guard was obtained by molding the sheet.

Subsequently, an impression was collected from a user (monitor) to produce a plaster model, and the sheet prepared was attached to a suction-type vacuum molding machine. The sheet was softened at a set temperature of 150° C., and thereafter a vacuum pump was operated with suction to mold the sheet. The molded sheet was trimmed to prepare a mouth guard. During the preparation of the mouth guard, the sheet had excellent operability without giving a sticky feel to the plaster model or fingers. There were obtained evaluations from the users that the mouth guard thus obtained had excellent durability and impact absorbability. The chewability and the vomiting feel were also evaluated by the above methods. The results are shown in Table 2.

Examples 2 to 4

The evaluations were made in the same manner as in Example 1 using a styrene-isoprene-styrene block copolymer (Example 2), a styrene-isoprene/butadiene-styrene block copolymer (Example 3) or a styrene-butadiene-styrene block copolymer (Example 4) shown in Table 1, which was prepared in the same manner as that in Example 1. The results are shown in Table 2.

Example 5

The evaluations were made in the same manner as in Example 2 except that a resin prepared by hydrogenating the styrene-isoprene-styrene block copolymer obtained in Example 2 was used. The results are shown in Table 2.

Comparative Example 1

A sheet for mouth guard made of an ethylene-vinyl acetate copolymer (manufactured by Company "S") was subjected to pressure molding at 150° C. to give a sheet having a thickness of 2 mm. The tests were carried out in the same manner as in Example 1 using this sheet. The results are shown in Table 2. This sheet was subjected to a Luebke impact resiliency test as prescribed in JIS 6255. As a result, it was found that the impact was absorbed very slowly upon impact as shown by 62% (first time), 41% (second time), 27% (third time), 18% (fourth time), 12% (fifth time) and 8.5% (sixth time).

Comparative Example 2

A resin composition comprising a composition of:

| | |
|---|---|
| copolymer (content of 1,2-bonds: 15% by mol) of polystyrene (30% by wt.) and polybutadiene (70% by wt.) | 67% by wt. |
| ester gum (glycerin ester of rosin) | 25% by wt. |
| methylstyryl-modified dimethylpolysiloxane | 8% by wt. | was molded to give a sheet having a thickness of 2 mm. The tests were carried out in the same manner as in Example 1 using this sheet. The results are shown in Table 2.

Comparative Examples 3 and 4

Evaluations were made in the same manner as in Example 1 using a styrene-isoprene-styrene block copolymer shown in Table 1 prepared in the same manner as that in Example 1. The results are shown in Table 2.

TABLE 1

| | Styrene Content (% by wt.) | Isoprene/ Butadiene Content (% by wt.) | Content of Vinyl Bonds (% by mol.) | Number-Average Molecular Weight (Mn) | Hydrogenation Ratio (%) |
|---|---|---|---|---|---|
| Ex. 1 | 20 | 80/0 | 75 | 103000 | 0 |
| Ex. 2 | 20 | 80/0 | 55 | 120000 | 0 |
| Ex. 3 | 20 | 40/40 | 80 | 127000 | 0 |
| Ex. 4 | 35 | 0/65 | 75 | 180000 | 0 |
| Ex. 5 | 20 | 80/0 (Before Hydrogenation) | 56 | 124000 | 95 |
| Comp. Ex. 3 | 50 | 50/0 | 75 | 110000 | 0 |
| Comp. Ex. 4 | 20 | 80/0 (Before Hydrogenation) | 25 | 115000 | 97 |

TABLE 2

| | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|
| Tensile Modulus (MPa) | 7 | 4 | 4 | 3 | 5 | 9 | 3 | 13 | 8 |
| Tensile Impact Strength (kJ/m$^2$) | 650 | 620 | 580 | 650 | 600 | 430 | 670 | 720 | 410 |

TABLE 2-continued

|  | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|
| Tensile Strength at Break (MPa) (Break Pt.) | 10 | 11 | 10 | 11 | 10 | 10 | 9 | 8 | 14 |
| Tensile Elongation at Break (%) (Break Pt.) | 900 | 1000 | 850 | 1000 | 800 | 1200 | 900 | 700 | 1250 |
| Tear Strength (MPa) (Break Pt. at 37° C.) | 2.0 | 2.1 | 2.0 | 2.4 | 2.0 | 2.0 | 2.2 | 2.5 | 1.9 |
| Tear Elongation (%) (Break Pt. at 37° C.) | 260 | 280 | 300 | 220 | 290 | 90 | 180 | 160 | 270 |
| Durometer Hardness (JIS-A) | 61 | 57 | 59 | 80 | 64 | 77 | 63 | 98 | 67 |
| Chewability (Score) | 88 | 92 | 75 | 80 | 80 | 22 | 40 | 16 | 50 |
| Lack of Vomiting Feel (Score) | 92 | 90 | 90 | 85 | 85 | 55 | 35 | 92 | 90 |

As is clear from Examples 1 to 5 of Table 2, the mouth guard of the present invention gave excellent results in all of the evaluation items as compared to those of Comparative Examples 1 to 4. It can be seen from the above that the mouth guard of the present invention has excellent impact absorbability, tear elongation at break and chewability and does not give any vomiting feel. The excellent tear elongation at break means that a breakage of the sheet due to cracks made upon use is less likely to be generated, and thereby showing excellent durability.

INDUSTRIAL APPLICABILITY

According to the present invention, there are provided a mouth guard, which sufficiently alleviates an external pressure and is suitable for protecting dentine and jaw bones, and also is excellent in durability and easily chewed with hardly giving a vomiting feel, and a sheet for mouth guard suitable for the production of the mouth guard.

The invention claimed is:

1. A mouth guard comprising 85% by weight or more of at least one block copolymer selected from the group consisting of:
   a block copolymer (a-1) comprising one or more polymer blocks A made of a vinyl aromatic compound, and one or more polyisoprene blocks B having a content of 1,2-bonds and 3,4-bonds of 40% by mol or more, wherein a content of vinyl aromatic compound units is from 10 to 40% by weight, and a hydrogenated product thereof (b-i);
   a block copolymer (a-2) comprising one or more polymer blocks A made of a vinyl aromatic compound, and one or more polymer blocks C which contain an isoprene unit and a butadiene unit in a ratio of from 5/95 to 95/5 (% by weight) and have a content of 1,2-bonds and 3,4-bonds of 40% by mol or more, wherein a content of vinyl aromatic compound units is from 10 to 40% by weight, and a hydrogenated product thereof (b-2); and
   a block copolymer (a-3) comprising one or more polymer blocks A made of a vinyl aromatic compound, and one or more polybutadiene blocks D having a content of 1,2-bonds of 60% by mol or more, wherein a content of vinyl aromatic compound units is from 10 to 40% by weight, and a hydrogenated product thereof (b-3).

2. A sheet for mouth guard comprising 85% by weight or more of at least one block copolymer selected from the group consisting of:
   a block copolymer (a-1) comprising one or more polymer blocks A made of a vinyl aromatic compound, and one or more polyisoprene blocks B having a content of 1,2-bonds and 3,4-bonds of 40% by mol or more, wherein a content of vinyl aromatic compound units is from 10 to 40% by weight, and a hydrogenated product thereof (b-1);
   a block copolymer (a-2) comprising one or more polymer blocks A made of a vinyl aromatic compound, and one or more polymer blocks C which contain an isoprene unit and a butadiene unit in a ratio of from 5/95 to 95/5 (% by weight) and have a content of 1,2-bonds and 3,4-bonds of 40% by mol or more, wherein a content of vinyl aromatic compound units is from 10 to 40% by weight, and a hydrogenated product thereof (b-2); and
   a block copolymer (a-3) comprising one or more polymer blocks A made of a vinyl aromatic compound, and one or more polybutadiene blocks D having a content of 1,2-bonds of 60% by mol or more, wherein a content of vinyl aromatic compound units is from 10 to 40% by weight, and a hydrogenated product thereof (b-3).

3. The mouth guard as claimed in claim 1, comprising 90% by weight or more of said at least one block copolymer.

4. The mouth guard as claimed in claim 1, wherein the polymer blocks A in block copolymers (a-1), (a-2) and (a-3)

comprise at least one vinyl aromatic compound selected from the group consisting of styrene, α-methylstyrene, 1-vinylnaphthalene, 3-methylstyrene, 4-propylstyrene, 4-cyclohexylstyrene, 4-dodecyistyrene, 2-ethyl-4-benzylstyrene, and 4-(phenylbutyl)styrene.

5. The mouth guard as claimed in claim 1, wherein the polymer blocks A in block copolymers (a-1), (a-2) and (a-3) comprise styrene.

6. The mouth guard as claimed in claim 1, wherein the number-average molecular weight of polymer block A in block copolymers (a-1), (a-2) and (a-3) is within a range of from 2500 to 50000.

7. The mouth guard as claimed in claim 1, wherein the number-average molecular weight of polymer block A in block copolymers (a-1), (a-2) and (a-3) is within a range of from 2500 to 20000.

8. The mouth guard as claimed in claim 1, wherein said block copolymer comprises at least one polyisoprene block B, and wherein said polyisoprene blocks B have a content of 1,2-bonds and 3,4-bonds of 45 to 90% by mol.

9. The mouth guard as claimed in claim 1, wherein said block copolymer comprises at least one polyisoprene block B, and wherein said polyisoprene blocks B have a content of 1,2-bonds and 3,4-bonds of from 50 to 80% by mol.

10. The mouth guard as claimed in claim 8, wherein the number-average molecular weight of polymer block B is within a range of from 10000 to 300000.

11. The mouth guard as claimed in claim 9, wherein the number-average molecular weight of polymer block B is within a range of from 100000 to 200000.

12. The mouth guard as claimed in claim 1, wherein said block copolymer comprises at least one block C, said blocks C have content of 1,2-bonds and 3,4-bonds of 45% by mol or more, and wherein said isoprene units and butadiene units are contained in a ratio of from 10/90 to 90/10 (% by weight).

13. The mouth guard as claimed in claim 12, wherein the number-average molecular weight of polymer block C is within a range of from 10000 to 300000.

14. The mouth guard as claimed in claim 12, wherein the number-average molecular weight of polymer block C is within a range of from 10000 to 200000.

15. The mouth guard as claimed in claim 1, wherein said block copolymer comprises at least one block D, said blocks D have a content of 1,2-bonds of 80% by mol or more.

16. The mouth guard as claimed in claim 1, wherein said block copolymer comprises at least one block D, said blocks D have a content of 1,2-bonds of 85% by mol or more.

17. The mouth guard as claimed in claim 15, wherein the number-average molecular weight of polymer block D is within a range of from 10000 to 300000.

18. The mouth guard as claimed in claim 16, wherein the number-average molecular weight of polymer block D is within a range of from 10000 to 200000.

19. The mouth guard as claimed in claim 1, comprising 90% by weight or more of said at least one block copolymer, wherein:

the polymer blocks A in block copolymers (a-1), (a-2) and (a-3) comprise at least one vinyl aromatic compound selected from the group consisting of styrene, a-methylstyrene, 1-vinylnaphthalene, 3-methyistyrene, 4-propyistyrene, 4-cyclohexyistyrene, 4-dodecyistyrene, 2-ethyl-4-benzylstyrene, and 4-(phenylbutyl)styrene;

the number-average molecular weight of polymer block A in block copolymers (a-1), (a-2) and (a-3) is within a range of from 2500 to 50000;

said polyisoprene blocks B have a content of 1,2-bonds and 3,4-bonds of 45 to 90% by mol;

the number-average molecular weight of polymer block B is within a range of from 10000 to 300000;

said blocks C have content of 1,2-bonds and 3,4-bonds of 45% by mol or more, and said isoprene units and butadiene units are contained in a ratio of from 10/90 to 90/10 (% by weight);

the number-average molecular weight of polymer block C is within a range of from 10000 to 300000;

said blocks D have a content of 1,2-bonds of 80% by mol or more; and the number-average molecular weight of polymer block D is within a range of from 10000 to 300000.

* * * * *